J. F. MORIARTY & L. L. KNEELAND.
DIRIGIBLE HEADLIGHT.
APPLICATION FILED MAY 21, 1914.

1,140,389.

Patented May 25, 1915.
2 SHEETS—SHEET 1.

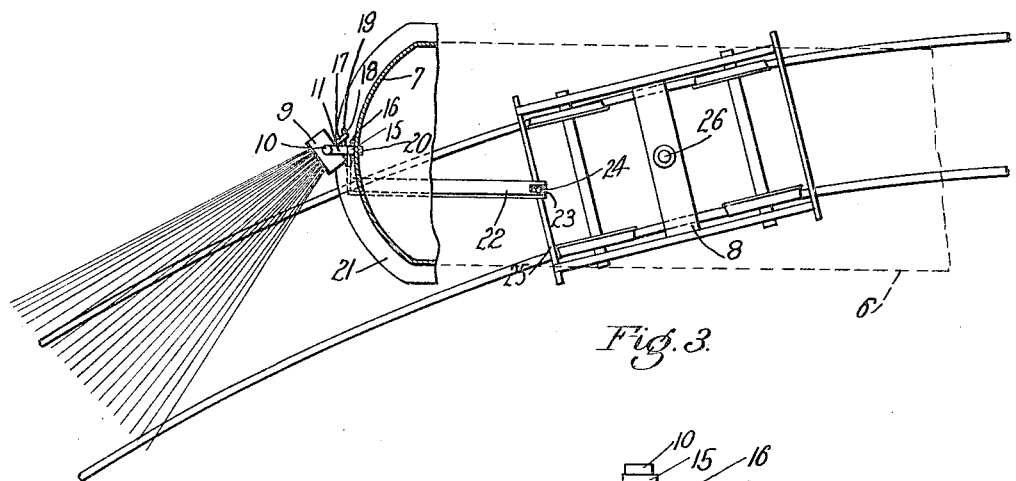
Fig. 3.
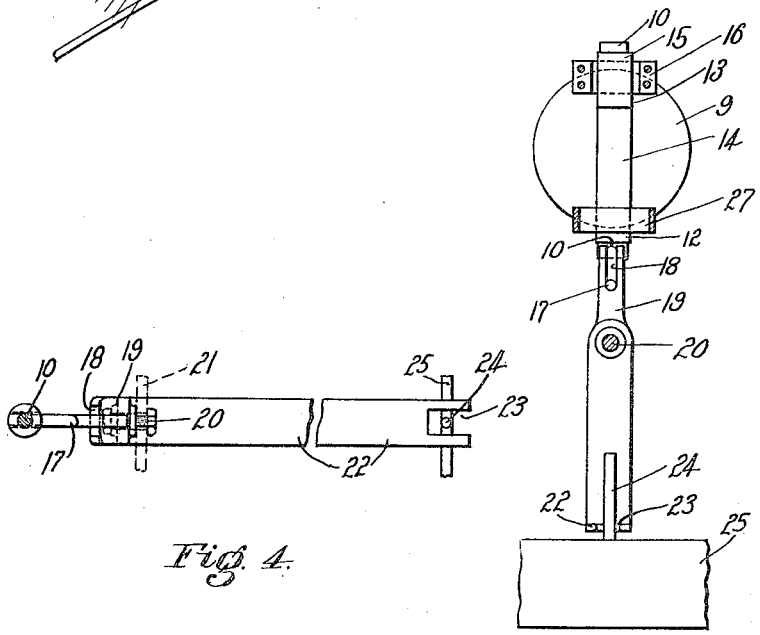
Fig. 4.
Fig. 5.

UNITED STATES PATENT OFFICE.

JOHN F. MORIARTY AND LESTER L. KNEELAND, OF LYNN, MASSACHUSETTS.

DIRIGIBLE HEADLIGHT.

1,140,389.  Specification of Letters Patent.  Patented May 25, 1915.

Application filed May 21, 1914. Serial No. 840,030.

*To all whom it may concern:*

Be it known that we, JOHN F. MORIARTY and LESTER L. KNEELAND, citizens of the United States, residing at Lynn, in the county of Essex and State of Massachusetts, have invented new and useful Improvements in Dirigible Headlights, of which the following is a specification.

This invention relates to a dirigible headlight for cars.

The object of the invention is to provide mechanism whereby a headlight for cars may be moved automatically by the front truck so as to direct the light from said headlight onto the tracks, whether the car is moving along a straight line of track or around a curve.

The invention consists in the combination and arrangement of parts set forth in the following specification and particularly pointed out in the claims thereof.

Figure 1:
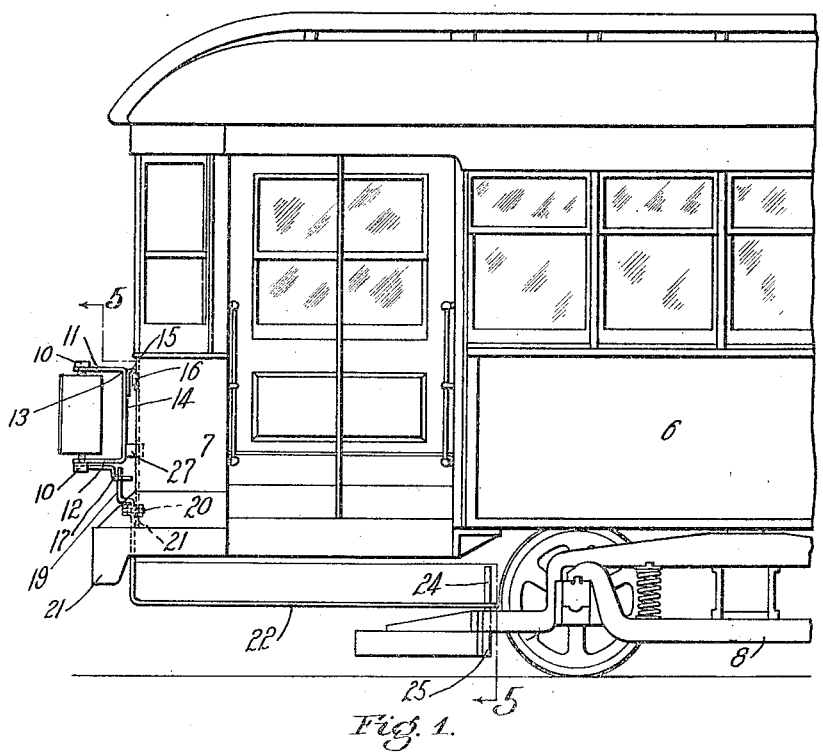
Figure 2:
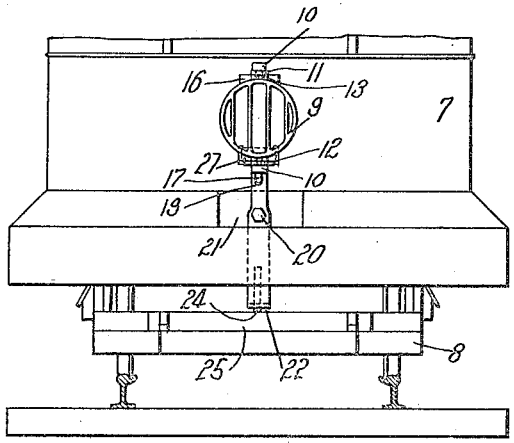

Referring to the drawings: Figure 1 is a side elevation of the front portion of a street car with our improved headlight attached thereto. Fig. 2 is a front elevation of the same. Fig. 3 is a plan view of the front truck of a car and a portion of the body of the car partly in section with our improved headlight attached thereto and the mechanism by which it is operated, a portion of the body of the car being indicated in dotted lines and the tracks upon which the truck is moving being also shown in plan view. Fig. 4 is a detail plan view, partly in section, of the mechanism whereby the headlight is moved into different positions. Fig. 5 is a sectional elevation taken on line 5—5 of Fig. 1 illustrating in detail the mechanism for rocking the headlight.

Like numerals refer to like parts throughout the several views of the drawings.

In the drawings, 6 is the body of a car, 7 the dashboard and 8 the forward truck.

9 is a lantern constituting a headlight having a vertical pivot 10 fastened thereto and journaled to rotate in the arms 11 and 12 of the U-shaped bracket 13 which has a cross-bar 14 connecting said arms and to this cross-bar is fastened a hook 15 adapted to engage a socket piece 16 fast to the front of the dashboard 7. The lower end of said cross-bar 14 has a plate 27 fast thereto which bears against the dashboard 7. The pivot 10 has fastened to its lower end a horizontal arm 17 which at its free end projects into a slot 18 provided in the upper end of a lever 19. The lever 19 is pivoted upon a stud 20 fast to a portion of the platform 21 of the car. Said lever 19 projects downwardly from the stud 20 and has a horizontally and rearwardly extending arm 22 which is provided at its rear end with a slot 23 adapted to engage a projection 24 on a plate 25 which is fastened to the forward truck 8. The truck 8 is pivoted at 26 to the body of the car and as it passes around a curve assumes different positions, one of which is illustrated in Fig. 3 of the drawings. When the truck thus passes around a curve the projecting pin 24 moves laterally in such a manner as to move the horizontally extending arm 22 and thus the lever 19 will be rocked upon the stud 20, thus imparting a rocking motion to the horizontal arm 17, the free end of which projects into the slot 18 in the upper end of said lever 19. By rocking the arm 17 a rocking motion is imparted to the headlight lantern 9, so that as the truck passes around a curve the lantern is turned into the proper position to throw the rays of light onto the track ahead of the car on said curve.

When it is desired to change the headlight from one end of the car to the other it may be done by lifting the U-shaped bracket off of the socket piece 16, together with the arm 17, and transferring the headlight to the opposite end of the car where it is suspended in a similar manner, the arm 17 being engaged by another lever similar to the lever 19 which is arranged to be operated by a projecting pin corresponding to the pin 24 upon the other truck.

Having thus described our invention, what we claim and desire by Letters Patent to secure is:

1. A device of the character described having, in combination, a U-shaped bracket constituting a holder and consisting of two horizontal arms connected by a vertical cross-bar, with a hook on said cross-bar, whereby said holder may be detachably fastened to the dashboard of a car, a vertical pivot on the arms of said holder, a lantern fast to said pivot and mechanism connected to said pivot and constructed and arranged to engage the front truck of said car whereby said lantern may be rocked by said truck to assume different positions.

2. A device of the character described having, in combination, a holder constructed and arranged to be detachably attached to the dashboard of a car, a vertical pivot on said holder, a lantern fast to said pivot, a horizontal arm fast to said pivot and extending rearwardly therefrom, a lever pivoted to the body portion of said car and arranged to swing about a horizontal axis, the upper end of said lever having a slot therein into which the free end of said horizontal arm is arranged to project, the lower end of said lever having a horizontally and rearwardly extending arm adapted to engage a projection on the forward truck of said car whereby said lantern may be rocked by said truck to assume different positions.

3. In combination, a car, a dashboard for said car, a socket piece fast to the front of said dashboard, a front truck pivotally connected to said car, a U-shaped bracket constituting a holder and consisting of two horizontal arms connected by a vertical cross-bar, a hook on said holder adapted to engage said socket piece and a plate on the lower end of said cross-bar arranged to bear against said dashboard, whereby said holder may be detachably fastened to said dashboard, a vertical pivot on the arms of said holder, a lantern fast to said pivot and mechanism connected to said lantern pivot and arranged to engage said front truck, whereby said lantern may be rocked by said truck to assume different positions.

In testimony whereof we have hereunto set our hands in presence of two subscribing witnesses.

JOHN F. MORIARTY.
LESTER L. KNEELAND.

Witnesses:
JOSEPH F. MCGRATH,
JAMES J. CONNAUGHTON.

Copies of this patent may be obtained for five cents each, by addressing the "Commissioner of Patents, Washington, D. C."